United States Patent
Wiesman et al.

(10) Patent No.: US 8,261,977 B2
(45) Date of Patent: Sep. 11, 2012

(54) METHODS AND SYSTEMS FOR USING AN INTERFACE AND PROTOCOL EXTENSIONS TO PERFORM A FINANCIAL TRANSACTION

(75) Inventors: Mark Wiesman, Chesterfield, MO (US); Carl Stefanelli, Paramus, NJ (US)

(73) Assignee: MasterCard International Incorporated, Purchase, NY (US)

( * ) Notice: Subject to any disclaimer, the term of this patent is extended or adjusted under 35 U.S.C. 154(b) by 13 days.

(21) Appl. No.: 12/827,924

(22) Filed: Jun. 30, 2010

(65) Prior Publication Data

US 2010/0268648 A1     Oct. 21, 2010

Related U.S. Application Data

(63) Continuation-in-part of application No. 12/748,119, filed on Mar. 26, 2010.

(60) Provisional application No. 61/164,240, filed on Mar. 27, 2009, provisional application No. 61/223,634, filed on Jul. 7, 2009.

(51) Int. Cl.
    *G06K 5/00*     (2006.01)

(52) U.S. Cl. ..................... 235/380; 235/382

(58) Field of Classification Search .......... 235/379, 235/380, 382, 383, 487, 492
See application file for complete search history.

(56) References Cited

U.S. PATENT DOCUMENTS

| | | | | |
|---|---|---|---|---|
| 5,559,887 | A | * | 9/1996 | Davis et al. .............. 705/68 |
| 6,029,151 | A | * | 2/2000 | Nikander ................. 705/39 |
| 6,227,447 | B1 | * | 5/2001 | Campisano .............. 235/380 |
| 7,051,002 | B2 | | 5/2006 | Keresman, III et al. |
| 7,080,048 | B1 | * | 7/2006 | Sines et al. .............. 705/75 |
| 7,140,036 | B2 | | 11/2006 | Bhagavatula et al. |
| 7,693,783 | B2 | | 4/2010 | Balasubramanian et al. |
| 7,742,967 | B1 | | 6/2010 | Keresman, III et al. |
| 2009/0119205 | A1 | | 5/2009 | Keresman, III et al. |

* cited by examiner

*Primary Examiner* — Daniel St.Cyr
(74) *Attorney, Agent, or Firm* — Armstrong Teasdale LLP

(57) ABSTRACT

A method for communicating financial transaction data between a plurality of computer devices using an interface module and an enhanced protocol is provided. The transaction is initiated by a cardholder at an input terminal using a transaction card for completing a purchase from a merchant. The method includes receiving at the interface module initial identification (ID) data from a merchant computer wherein the interface module is a computer module separate from the merchant computer, generating a first verification enrollment request (VEReq) message based on the initial ID data that includes at least one of a merchant identifier and an account number, transmitting the first VEReq message, receiving a verification enrollment response (VERes) message affirmatively verifying enrollment of the merchant in an express check out program, and generating at the interface module a payer authentication request (PAReq) message using the enhanced protocol that defines a first set of data field extensions.

27 Claims, 7 Drawing Sheets

METHODS AND SYSTEMS FOR USING AN INTERFACE AND PROTOCOL EXTENSIONS TO PERFORM A FINANCIAL TRANSACTION

CROSS-REFERENCE TO RELATED APPLICATIONS

This application is a continuation-in-part of U.S. patent application Ser. No. 12/748,119, filed Mar. 26, 2010, which claims the benefit of U.S. Provisional Application No. 61/164,240, filed Mar. 27, 2009; and this application also claims the priority of U.S. Provisional Patent Application Ser. No. 61/223,634, filed Jul. 7, 2009, which are all incorporated herein by reference.

BACKGROUND OF THE INVENTION

This invention relates generally to systems and methods for using an interface module and an enhanced protocol to perform a financial transaction and, more particularly, to network-based systems and methods for using a computer-to-computer interface and protocol extensions to communicate data between computer devices when performing a financial transaction initiated by a cardholder using a transaction card with a merchant.

Financial transaction cards are widely used in the United States and elsewhere as a means to attract financial accounts to financial institutions and, in the case of credit cards, as a medium to create small loans and generate interest income for financial institutions.

The financial transaction card industry is subject to certain well-known problems. For example, in the credit card industry, it is well-known that at least some persons will engage in fraudulent activities through either the theft of a credit card or a credit card number. The utilization of financial transaction cards in online transactions exacerbates the risk of fraudulent activity. Financial transaction card companies have thus implemented increased security measures to reduce the instances of such fraudulent activity. These increased security measures utilize a standardized protocol for communicating transaction information between computer devices, and require a user to provide access credentials (e.g., a username and/or password) in addition to their credit card number to complete a transaction with a merchant.

At least some known credit card networks (also known as interchange networks) have implemented initiatives or programs aimed at safeguarding against fraud. For example, Visa® and MasterCard® both support authentication initiatives whereby a cardholder is authenticated by the bank or financial institution issuing the financial transaction card (i.e., the issuing bank).

When using these types of authentication initiatives, the credit card network often ensures participating merchants that fraudulent transactions and other charge backs, will not be the merchants' responsibility provided the specified protocols have been followed. However, in order to participate in these authentication initiatives the merchants are required to have certain minimum computer processing capabilities. For example, a merchant may be required to have a certain computing power, memory, data storage capacity, etc. Further, the merchants are responsible for remaining current with initiative protocols that can change periodically.

In addition to providing information to satisfy the security measures/authentication initiatives implemented by merchants, issuing banks or other parties involved in the online purchasing process, cardholders must also manually provide other information to the merchant to complete the transaction. This information can include, for example, billing and/or shipping addresses, or the name, birth date, phone number, email address or other information concerning the cardholder. This information is typically received when the cardholder manually enters the information into a computer system/input device. The process of manually entering this information can be time-consuming and tedious for the cardholder. Furthermore, the user-entered information may contain errors (e.g., typographical errors) since it is manually provided by the user.

Accordingly, a system and method is needed that utilizes known protocols for communicating information between computer devices to exchange transaction data between the computer devices in order to enhance and further automate the transaction process. The system also should be capable of being implemented without requiring major changes to existing technology utilized by merchants for processing transactions. The system should also be easily implementable and updateable on a variety of merchant systems.

BRIEF SUMMARY OF THE INVENTION

In one aspect, a method for communicating financial transaction data between a plurality of computer devices using an interface module and an enhanced protocol is provided. The financial transaction is initiated by a cardholder at an input terminal using a transaction card for completing a purchase from a merchant. The method includes receiving at the interface module initial identification (ID) data from a computer associated with the merchant wherein the interface module is a computer module separate from the merchant computer, generating a first verification enrollment request (VEReq) message at the interface module based on the initial ID data wherein the first VEReq message includes at least one of a merchant identifier and an account number, transmitting the first VEReq message to an interchange network computer system, receiving a verification enrollment response (VERes) message from the interchange network computer system wherein the VERes message affirmatively verifies enrollment of the merchant in an express check out program, and generating at the interface module a payer authentication request (PAReq) message using the enhanced protocol wherein the enhanced protocol defines a first set of data field extensions associated with the PAReq message.

In another aspect, a system for processing a financial transaction using an enhanced protocol is provided. The system includes an interchange network computer system, and an interface module in communication with a merchant computer system, a cardholder input terminal, and the interchange network computer system. The cardholder input terminal is configured to access a merchant website by communicating with the merchant computer system to enable a cardholder to initiate the financial transaction using a transaction card. The interface module is a computer module separate from the merchant computer. The interface module is configured to process the financial transaction by communicating with the interchange network computer system using an enhanced protocol.

In another aspect, an interchange network computer for processing a financial transaction using an enhanced protocol is provided. The financial transaction is initiated by a cardholder with a merchant using a transaction card. The interchange network computer includes an interchange processor, and an interface module in communication with a merchant computer system, a cardholder input terminal, and the interchange processor. The interface module is programmed to receive initial identification (ID) data from the merchant computer system in response to the initiated financial transaction, generate a first verification enrollment request (VEReq) message based on the initial ID data wherein the first VEReq message includes a merchant identifier used to verify the enrollment of the merchant in an express check out program, transmit the first VEReq message to the interchange processor, receive a verification enrollment response (VERes) message from the interchange processor wherein the VERes message affirmatively verifies enrollment of the merchant in the express check out program, and generate a payer authentication request (PAReq) message using the enhanced protocol wherein the enhanced protocol defines a first set of data field extensions associated with the PAReq message.

In another aspect, a computer program is provided. The computer program is embodied on a computer readable medium for communicating financial transaction data between a plurality of computer devices using an interface module and an enhanced protocol. The financial transaction is initiated by a cardholder at an input terminal using a transaction card for completing a purchase from a merchant. The program comprises at least one code segment executable by the interface module to instruct the interface module to: receive initial identification (ID) data from a computer associated with the merchant wherein the interface module is a computer module separate from the merchant computer, generate a first verification enrollment request (VEReq) message based on the initial ID data wherein the first VEReq message including at least one of a merchant identifier and an account number, transmit the first VEReq message to an interchange network computer system, receive a verification enrollment response (VERes) message from the interchange network computer system wherein the VERes message affirmatively verifying enrollment of the merchant in an express check out program, and generate a payer authentication request (PAReq) message using the enhanced protocol, the enhanced protocol defining a first set of data field extensions associated with the PAReq message.

In another aspect, a method for communicating financial transaction data between a plurality of computer devices using an interface module and an enhanced extension protocol is provided. The plurality of computer devices includes an input terminal, a merchant computer system, and an interchange network computer system. The financial transaction is initiated by a cardholder at the input terminal using a transaction card for completing a purchase from a merchant. The method includes a) receiving initial identification (ID) data from a merchant computer; b) generating a first verification enrollment request message, the first verification enrollment request message including a merchant identifier used to verify the enrollment of the merchant in an express check out program; c) sending the first verification enrollment request message to the interchange network computer system; d) receiving a verification enrollment response message from the interchange network computer system; e) generating a payer authentication request message using the enhanced protocol extensions; f) sending the payer authentication request message to the interchange network computer system; g) opening a session between the cardholder workstation and the interchange network computer system; h) receiving a payer authentication response message using the enhanced protocol extensions from the interchange network computer system; i) extracting data from the payer authentication response message and enhanced protocol extensions, and formatting the extracted data into a predefined format; j) sending the data to the merchant computer system; and k) directing the input terminal to a specified merchant website such that the cardholder can complete the transaction.

In another aspect, a system for performing a financial transaction using an enhanced extension protocol is provided. The system includes a merchant computer system configured to provide a user interface to facilitate purchasing at least one of merchant goods and merchant services by a cardholder. The system also includes an input terminal configured to display the user interface and receive cardholder inputs. The system also includes an interchange network configured to verify merchant and/or cardholder enrollment in an express check out program based on received data. The system also includes an interface platform configured to facilitate communication between at least one merchant computer system and the interchange network, and to facilitate communication between the input terminal and the interchange network.

An interface module for performing a financial transaction using an enhanced extension protocol is provided. The interface module is configured to receive initial identification (ID) data from a merchant computer, generate a first verification enrollment request message wherein the first verification enrollment request message includes a merchant identifier used to verify the enrollment of the merchant in an express check out program, transmit the first verification enrollment request message to an interchange network computer system, generate a payer authentication request message using the enhanced protocol extensions, transmit the payer authentication request message to the interchange network computer system, and open a session between a cardholder workstation and the interchange network computer system.

DETAILED DESCRIPTION OF THE INVENTION

Figure 1:
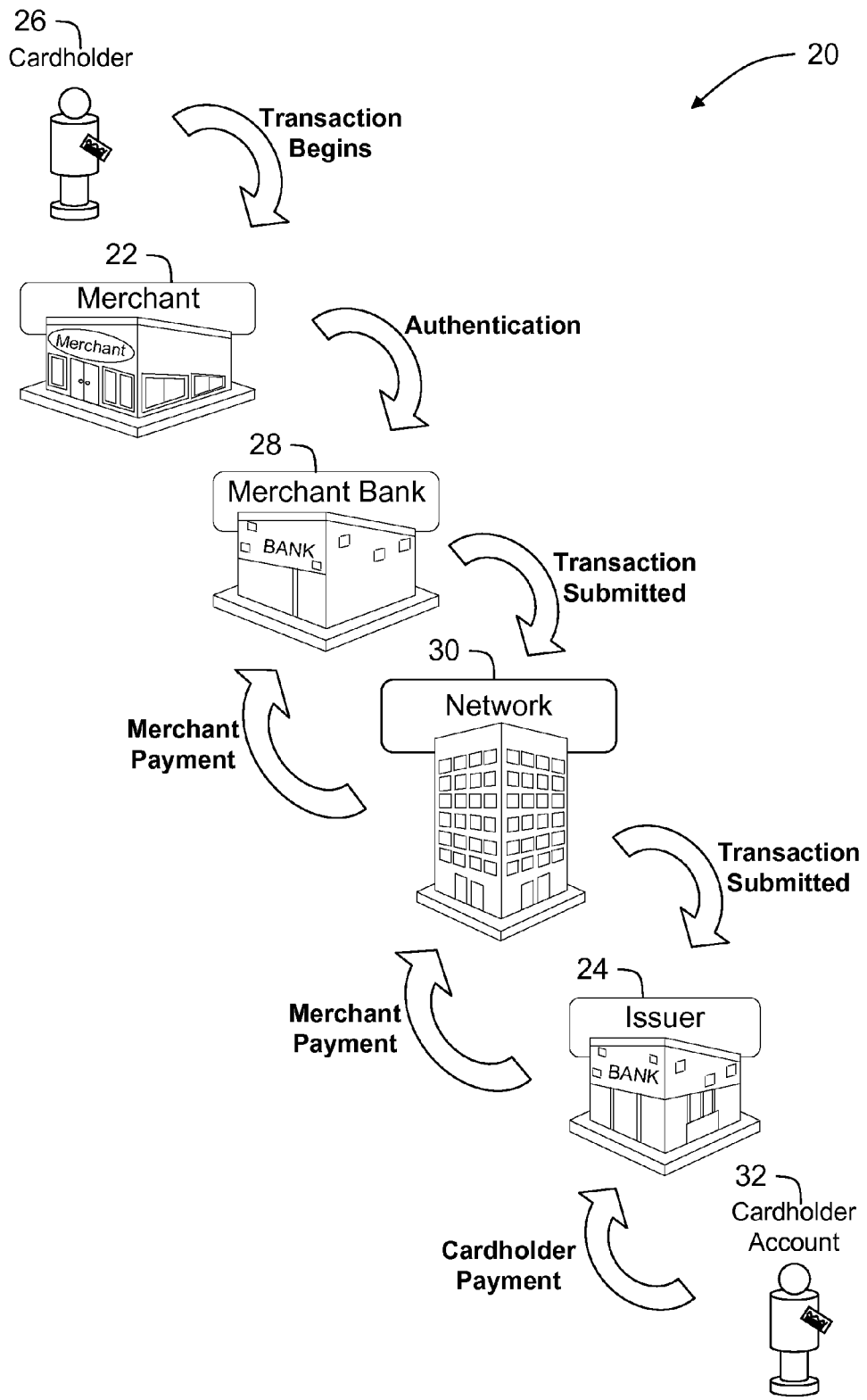
FIG. 1 is a schematic diagram illustrating a known multi-party transaction card industry system for enabling ordinary payment-by-card transactions in which the merchants and issuer do not need to have a one-to-one special relationship.

The methods and systems described herein relate to a financial transaction card payment system, such as a credit card payment system using the MasterCard® interchange (MasterCard is a registered trademark of MasterCard International Incorporated located in Purchase, N.Y.). The MasterCard® interchange is a proprietary communications standard promulgated by MasterCard International Incorporated® for the exchange of financial transaction data between financial institutions that have registered with MasterCard International Incorporated®.

The following detailed description illustrates embodiments of the invention by way of example and not by way of limitation. It is contemplated that the invention has general application to processing financial transaction data by a third party in industrial, commercial, and residential applications. As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments provided herein facilitate decreasing manual order data input and increasing order data accuracy in connection with an online purchase transaction. Such embodiments further facilitate managing cardholder data (e.g., transaction card data and address data), which is usable with multiple merchant systems, in a single computer system with one set of access credentials for the user, thereby reducing the duplication of such cardholder data across merchant-specific user profile systems.

As used herein, the term "transaction card" refers to any suitable transaction card, such as a credit card, a debit card, a membership card, a promotional card, a frequent flyer card, an identification card, a prepaid card, a gift card, and/or any other device that may hold payment account information, such as mobile phones, personal digital assistants (PDAs), and key fobs.

The embodiments described herein are directed to systems and methods for using an interface module and an enhanced protocol that defines data field extensions for communicating information between computer devices when performing a financial transaction using the computer devices. The enhanced protocol is a computer protocol that defines data field extensions that allow for additional information to be communicated between devices. The financial transaction is performed by a user of a financial transaction card, such as a credit card, debit card, or other financial transaction card. These users are referred to as cardholders. A cardholder is issued a transaction card by an issuer or an issuing bank. The cardholder is able to use the transaction card at participating merchants to initiate financial transactions. The merchant processes these transactions using a point-of-sale (POS) device or other computer device that captures certain transaction information and communicates this information over an interchange network to an acquiring bank and ultimately to the issuer. For example, the cardholder may use the transaction card to complete a purchase via a merchant website hosted on a merchant computer.

Typically, when making a purchase via a merchant website, the cardholder selects items to be purchased and transmits transaction card information to the merchant. The merchant then communicates this information over an interchange network to an acquiring bank and to the issuer. Information is then exchanged between these parties over the interchange network until the transaction is completed. The computer devices communicate with one another by using a standard computer protocol.

In the exemplary embodiment, the systems and methods use data field extensions that have been added to the protocol to communicate additional information between the computer devices when performing a financial transaction between a cardholder and a merchant over the interchange network. The extensions are added to the protocol, which is the defined communication framework controlling the exchange of data between the computer devices. The protocol having these added extensions is referred to herein as an enhanced protocol. The protocol described herein is an authentication protocol commonly used to provide increased security in financial card transactions. The authentication protocol permits the cardholder to set up access credentials (i.e., a username and/or password) for one or more transaction cards issued to them. When the cardholder later attempts to perform a financial transaction with one of the transaction cards, they must provide their access credentials to complete the transaction. In an alternative embodiment, when the cardholder later attempts to perform a financial transaction with the transaction card, they must provide, in addition to their credit card number or other assigned number, their associated access credentials to complete the transaction. The authentication protocol thus provides a standard method of establishing and communicating the access credentials in conjunction with financial card transactions.

The authentication protocol defines the format and specific types of information exchanged between a cardholder, a merchant and the interchange network. Utilizing extensions to the authentication protocol permits additional information to be transferred between the merchant, the interchange network, and the cardholder without requiring the development and implementation of either a new protocol or additional network infrastructure. The information contained in the extensions is thus communicated between the merchant and the interchange network using the known authentication protocol.

In operation, when a cardholder initiates a financial transaction with a merchant over an interchange network, the cardholder indicates to the merchant through an input device the cardholder's selection of an express check out option offered by the merchant to complete the transaction. For example, a cardholder interacting with a merchant website via a cardholder workstation may select the express check out option. Upon receipt of the express check out option, the merchant computer device sends initial identification (ID) data and transaction data to an express check out (ECO) interface, also referred to herein as an interface module. The ECO interface generates a first verification enrollment request (VEReq) message using the enhanced protocol extensions from the initial ID data. The VEReq message may include information identifying the cardholder's computer (e.g., a uniform resource locator), merchant identification information (e.g., a merchant identifier), and/or an account number. The VEReq message is transmitted to a directory server of the ECO system. The ECO system also being referred to as an interchange network computer system.

According to one embodiment, the merchant identifier is specific to the merchant. In another embodiment, the account number is specific to (e.g., assigned to) the cardholder/user, while in other embodiments, the account number is a predefined or static number provided by the merchant to the directory server. In either of these embodiments, the directory server checks the enrollment status of the merchant identifier and/or account number against a list of enrolled merchant identifiers or account numbers (e.g., to determine whether the merchant or the account number is enrolled in a secure transaction processing program and/or a cardholder authentication program), and returns a verify enrollment response (VERes) message to the ECO interface indicating the status of the enrollment of the merchant identifier/account number. For example, if the merchant identifier or account number is included in the list of enrolled numbers, the directory server transmits a VERes message with a positive (e.g., true or "yes") response verifying the enrollment of the cardholder and/or the merchant in the express check out program. If the account number or merchant identifier is not included in the list of enrolled account numbers and merchant identifiers, the directory server transmits a VERes message with a negative (e.g., false or "no") response.

The cardholder proceeds to select, using the input device, the items (e.g., products and/or services) which the cardholder desires to purchase from the merchant. Alternatively, the cardholder may select such items prior to indicating an intention to use the express check out feature. After the user has selected items to purchase and the ECO interface has received a VERes message with a positive response, the ECO interface generates a payer authentication request (PAReq) message with one or more predefined extensions and transmits the PAReq message to the ECO system. For example, the ECO interface may transmit the PAReq message to a check out platform of the ECO system, which is also known as the interchange computer system. The ECO interface also establishes a session between the cardholder workstation and the ECO system. The PAReq message includes the enhanced protocol extensions for communicating additional information between the ECO interface and the ECO system.

The PAReq data field extensions include at least a brands supported extension, a purchase details extension, and/or a time limit extension. A brands supported extension indicates the different types of transaction cards that the merchant will accept to complete the current transaction. In one embodiment, the brands supported extension includes a collection of one or more payment brands (e.g., interchange networks) with which the merchant is associated. For example, the PAReq message may include an identifier of each interchange network through which the merchant has agreed to submit transactions.

A purchase details extension includes detailed information for one or more items being purchased by the cardholder. For example, a purchase details extension may include, without limitation, an item identifier (e.g., a stock keeping unit (SKU) number), an item category (e.g., food or clothing), an item name, and/or an item price.

A time limit extension includes an amount of time (i.e., a duration) that the ECO interchange will wait for a response to a PAReq message. In one embodiment, if the ECO interchange has not received a payer authentication response (PARes) message for the PAReq message within the duration, the ECO interchange may abort processing of the transaction.

Upon receipt of the PAReq message, the ECO system (e.g., the check out platform) prompts the cardholder to enter access credential information, such as, but not limited to, a username, a password, a security token, and/or biometric data. In one embodiment, the ECO system (interchange computer system) receives a request that originates at the client computer device and is forwarded to the interchange computer system by the ECO interface. In another embodiment, the ECO interface refers the client computer device to an address (e.g., a uniform resource indicator (URI)) associated with the ECO system (interchange computer system), and the ECO system receives a request directly from the client computer device. In either embodiment, the ECO system prompts the cardholder for credential access information by providing a user interface to the cardholder computer device.

The cardholder enters the access credential information, and the ECO system receives the access credential information from the cardholder computer device. The ECO system verifies the access credential information. If the verification succeeds (e.g., the access credential information matches access credential information stored by and/or calculated by the ECO system), the ECO system prompts the cardholder for payment information for the current transaction. Payment information includes, without limitation, transaction card information, contact information (e.g., an email address and/or a telephone number), a promotion code, billing information, and/or shipping information. Transaction card information may include, for example, a card identifier (e.g., an account number, a partial account number, and/or a card name), a security code, and/or an expiry date. Shipping information may include, for example, a delivery address and/or delivery instructions.

In some embodiments, the ECO system prompts the cardholder to select from one or more options indicating previously stored payment information. For example, the ECO system may prompt the cardholder to select a transaction card from one or more transaction cards previously associated with the cardholder. The ECO system may similarly prompt the cardholder to select any other payment information. In one embodiment, the ECO system includes in the collection of transaction cards only cards that are associated with a brand (e.g., an interchange network) indicated by the brands supported extension in the PAReq message.

As explained above, the ECO system, which is associated with the interchange network, receives information from the cardholder via the cardholder workstation (e.g., access credentials, transaction card selection, and shipping information), and verifies enrollment of the cardholder in the express check out program. The ECO system then generates a payer authorization response (PARes) message that includes the enhanced protocol extensions. The PARes message may include, for example, transaction card and shipping information. To generate the PARes message, the ECO system formats the transaction card and shipping information into certain predefined extension fields that are included within the PARes message. At least some of this data is previously stored in a database coupled to the ECO system and associated with the cardholder. For example, the extensions associated with the PARes message may include at least a billing information extension, a security code (e.g., CVC2) extension, an expiry date extension, a PAN (Primary Account Number) extension, a phone number extension, a promotion code extension, and a shipping information extension.

The ECO system sends the PARes message to the ECO interface. The ECO interface extracts data from the PARes message and the enhanced protocol extensions, and formats the extracted data into a predetermined format such that it is readable by the merchant computer system. ECO interface then sends the extracted data to the merchant. The merchant is able to use the data to automatically populate order forms, thus relieving the cardholder of the need to provide the information manually. For example, the data received can include the cardholder's full name and shipping address which is then automatically populated in an order form. The ECO interface also directs the cardholder workstation to a specified merchant website. When the cardholder selects a final submit option on the merchant website, the merchant computer device sends final order data to the ECO interface. The final order data may include a total cost of the transaction, which is based at least in part on the received information (i.e., the selected items for purchase and the shipping costs calculated based on the shipping address).

The ECO interface generates a second VEReq message, that includes enhanced protocol extensions, based on the final order data received from the merchant. The enhanced protocol extensions may include, without limitation, certain predefined extensions including a final transaction amount extension, an approve/decline extension, a promotion code usage extension, and a transaction ID extension. For example, the ECO interface may specify a final transaction amount, which accounts for any applicable sales tax, shipping costs, and/or discounts, in the final transaction amount extension. The approved/declined extension may include an authorization response code received by the merchant computer system when processing the transaction. The promotion code usage extension may include an indication of any promotion codes used in connection with the transaction. A promotion code is an identifier associated with a discount, a merchant credit, a financial institution credit, a rebate, and/or any adjustment applied to a purchase transaction to reduce a total transaction amount. The transaction ID extension may include a unique identifier generated by the ECO interface and/or the interchange computer system to identify a plurality of related transactions.

The ECO system receives the second VEReq message and recognizes (e.g., based on a transaction ID) the second VEReq message as being associated with the financial transaction for which the first VEReq message and the PAReq message were previously received. The ECO system stores at least a portion of the data in the VEReq extensions. For example, the ECO system may associate the final transaction amount and/or promotion code usage with other information (e.g., item information) related to the transaction. Because the ECO system has determined that verify enrollment and payer authentication have already been performed for the financial transaction, the ECO system transmits a negative VERes message to the ECO interface, which terminates execution with respect to verify enrollment and payer authentication of the current transaction in response. The ECO interface completes execution of the financial transaction, such as by subsequently settling the transaction.

The ECO interface module is configured to perform the functions described herein on behalf of one or more merchants. Furthermore, the ECO interface module may perform the functions described herein in real-time or in batch. As explained below, the ECO interface module is a computer platform that is separate from the merchant computer and the cardholder input device. The ECO interface module may be part of the interchange network computer system or may be separate from the interchange network computer system. The interface module is associated with the interchange network computer system. The interface module may be computer hardware, software or a combination of the two, which may be part of or stored on the interchange network computer system.

A technical effect of the systems and methods described herein include at least one of a) receiving initial ID data from a merchant computer including at least one of a merchant identifier and an account number; b) generating a first verification enrollment request message, the first verification enrollment request message including at least one of a merchant identifier used to verify the enrollment of the merchant in an express check out program, and an account number used to verify the enrollment of the cardholder in the express check out program; c) sending the first verification enrollment request message to an interchange network computer system; d) receiving a verification enrollment response message from the interchange network computer system indicating whether cardholder authentication is available; e) generating a payer authentication request message using the enhanced protocol extensions, wherein the payer authentication request message is associated with the cardholder and includes data representing at least one of transaction card brands supported for payment, a response time limit, and item purchase information; f) sending the payer authentication request message to the interchange network computer system; g) opening a session between a cardholder workstation and the interchange network computer system; h) prompting the cardholder to enter access credential information; i) verifying the entered access credential information at the interchange network computer; j) prompting the cardholder to select a transaction card from one or more transaction cards associated with the cardholder; k) receiving a payer authentication response message using the enhanced protocol extensions from the interchange network computer system, the payer authentication response message including transaction card data associated with the selected transaction card; l) extracting data from the payer authentication response message and the enhanced protocol extensions, and formatting the extracted data into a predefined format; m) sending the data to the merchant computer; n) directing the cardholder workstation to a specified merchant website; o) transmitting a second verify enrollment request including a total transaction amount to the interchange network computer; p) associating the total transaction amount with the transaction at the interchange network computer; and q) receiving from the interchange network computer a negative verify enrollment response.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T, New York, N.Y.). The computer program described herein is flexible and designed to run in various different environments without compromising any major functionality.

The systems and methods described herein are not limited to the specific embodiments described herein. In addition, components of each system and steps of each method can be practiced independent and separate from other components and steps described herein. Each component and step also can be used in combination with other systems and methods.

FIG. 1 illustrates a known multi-party transaction card industry system 20 for enabling ordinary payment-by-card transactions in which a merchant 22 and an issuer 24 do not need to have a one-to-one special relationship. Issuer 24 is a financial institution that provides a transaction card, such as a credit card, to a cardholder 26, who uses the card to tender payment for a purchase from merchant 22. To accept payment with the card, merchant 22 must normally establish an account with a financial institution 28 called the "merchant bank," "acquiring bank," or "acquirer bank." When cardholder 26 tenders payment for a purchase with a card, merchant 22 requests authorization from merchant bank 28 for the amount of the purchase. The request may be performed over the telephone, but is usually performed through the use of a point-of-sale (POS) terminal, which reads the cardholder's account information from the magnetic stripe or chip on the card and communicates electronically with the transaction processing computers of merchant bank 28. The request may also be performed after cardholder account information is collected via a merchant website. Alternatively, merchant bank 28 may authorize a third party called a "merchant processor," an "acquiring processor," or a "third party processor" to perform transaction processing on its behalf. In this case, the point-of-sale terminal will be configured to communicate with the third party. A point-of-sale terminal may include, without limitation, a computer system operated by a merchant and/or by a cardholder.

Using an interchange computer system that is associated with an interchange network 30, the computers of merchant bank 28 communicate with the computers of issuer bank 24 to determine whether a cardholder's account 32 is in good standing and whether the purchase is covered by the consumer's available credit line. Based on these determinations, the request for authorization will be declined or accepted. If the request is accepted, an authorization code is issued to merchant 22 and an available credit line of cardholder's account 32 is decreased.

Normally, a charge for a credit transaction is not posted immediately to cardholder's account 32 because bankcard associations, such as MasterCard International Incorporated®, have promulgated rules that do not allow merchant 22 to charge, or "capture," a transaction until goods are shipped or services are delivered. However, with respect to at least some debit card transactions, a charge may be posted at the time of the transaction. When merchant 22 ships or delivers the goods or services, merchant 22 captures the transaction by, for example, appropriate data entry procedures on the POS terminal. This may include bundling of approved transactions daily for standard retail purchases. If cardholder 26 cancels a transaction before it is captured, a "void" is generated. If cardholder 26 returns goods after the transaction has been captured, a "credit" is generated.

After a transaction is captured, the transaction is settled between merchant 22, merchant bank 28, interchange network 30, and issuer 24. Settlement refers to the transfer of financial data or funds between merchant 22, merchant bank 28, interchange network 30, and issuer 24 related to the transaction. Usually, transactions are captured and accumulated into a "batch," and are settled as a group. More specifically, a transaction is typically settled between issuer 24 and interchange network 30, and then between interchange network 30 and merchant bank 28, and then between merchant bank 28 and merchant 22.

Financial transaction cards or payment cards can refer to credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
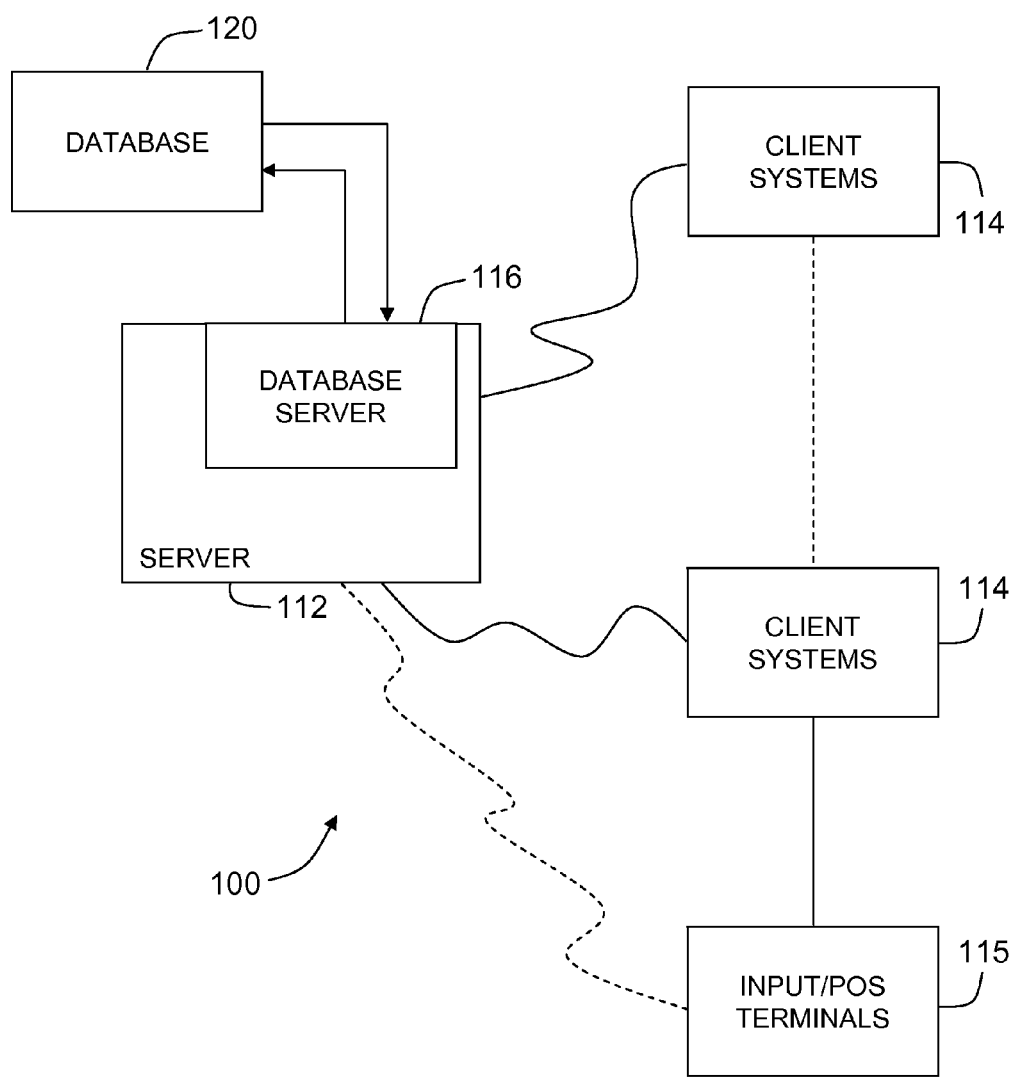
FIG. 2 is a simplified block diagram of a typical server architecture of a system that facilitates authenticating an identity of a customer in accordance with the present invention.

FIG. 2 is a simplified block diagram of an exemplary system 100 in accordance with one embodiment of the present invention. In the exemplary embodiment, system 100 facilitates ensuring that a person attempting to use a transaction card or its corresponding account number is the legitimate cardholder. More specifically, in the exemplary embodiment, system 100 includes a server system 112 communicatively coupled to a plurality of client systems 114, also known as input devices.

In the exemplary embodiment, client systems 114 are computers that include a web browser, which enable client systems 114 to access server system 112 using the Internet. More specifically, client systems 114 are communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), and a cable modem. Client systems 114 can be any device capable of accessing the Internet including, but not limited to, a desktop computer, a laptop computer, a personal digital assistant (PDA), a cellular phone, a smartphone, or other web-based connectable equipment.

System 100 may also include an input or point-of-sale (POS) terminals 115, for example, a POS terminal and/or a cardholder workstation, which is connected to client systems 114 and may be connected to server system 112. Input terminals 115 may be interconnected to the Internet through a variety of interfaces including a network, such as a LAN or a WAN, dial-in-connections, cellular connections, cable modems, wireless modems, and special high-speed ISDN lines. Input terminals 115 may be any device capable of interconnecting to the Internet to provide transaction card information to client systems 114 and/or server system 112.

A database server 116 is communicatively coupled to a database 120 that contains a variety of information including, but not limited to, a name of a cardholder, an account number, a transaction history, a billing address, a shipping address, the cardholder's date of birth, telephone number(s) associated with the cardholder (e.g., a mobile, work, or home telephone number), email addresses associated with the cardholder, and other cardholder-related information. Moreover, the database 120 can include multiple account numbers associated with a single cardholder. More specifically, a cardholder may be issued multiple transaction cards. Database 120 may store the multiple transaction card numbers associated with the single cardholder. In addition, each particular account number can have its own corresponding set of information specific to the particular account number. For example, different account numbers can have different shipping addresses associated therewith. In the exemplary embodiment, database 120 is stored remotely from server system 112. In some embodiments, database 120 is decentralized. In the exemplary embodiment, a person can access database 120 via client systems 114 by logging onto server system 112.

The database 120 also includes information relating to the authentication protocol described above. According to some embodiments, the authentication protocols may be referred to as Three Domain Protocol (3-D Secure®) (3-D Secure is a registered trademark of Visa International Service Association located in Foster City, Calif.) or MasterCard Secure-Code® (MasterCard SecureCode is a registered trademark of MasterCard International Incorporated located in Purchase, N.Y.). The authentication protocol in these embodiments is utilized by other financial card companies as well. The authentication protocol defines a standard for utilizing access credentials (i.e., a username and/or password) to verify the identity of a user of a financial card. The standard for utilizing access credentials includes, for example, procedures for establishing the credentials, procedures for requesting and verifying the veracity of the credentials, and standards for communicating the results of the verification of the credentials to the directory server (i.e., interchange network) and/or the issuing bank. Protocols in general are commonly recognized as a set of rules governing the format of messages that are exchanged between computers. For example, a protocol may be a specific set of rules, procedures, or conventions relating to format and timing of data transmission between two devices.

The extensions described herein that are defined by the enhanced protocol are data fields that may include a variety of information that is communicated in accordance with the authentication protocols. The extensions thus utilize the underlying infrastructure of the authentication protocols, without requiring modification of the protocols, to communicate information between the merchant computer, the cardholder input device, the express check out (ECO) interface module, and an ECO system. The content of the information included within the extensions varies based on the type of communication being made. For the purposes of discussion herein, four types of communication are provided, although additional types of communication are contemplated as well.

In one embodiment, the four communication types include: a verification enrollment request (VEReq), a verification enrollment response (VERes), a payer authorization request (PAReq), and a payer authorization response (PARes). Specific examples of the use of the types of communication are discussed in greater detail below. Table 1 summarizes the fields included within the extensions and the types of communications which they are utilized.

card. Accordingly, server system 112 and client systems 114 may be utilized to process transaction data relating to purchases made by a cardholder utilizing a transaction card that is processed by the interchange network and issued by the associated issuer. Another client system 114 may be associated with a user or a cardholder seeking to register, access information, or process a transaction with at least one of the interchange network, the issuer, or the merchant.

The embodiments illustrated and described herein as well as embodiments not specifically described herein but within the scope of aspects of the invention constitute exemplary means for performing a financial transaction, and more particularly, constitute exemplary means for performing a financial transaction using an interface that utilizes extensions to an authentication protocol. For example, the server system

TABLE 1

| Field | Description | VEReq | VERes | PAReq | PARes |
|---|---|---|---|---|---|
| Billing Info | Billing address for the cardholder | | | | X |
| Brands Supported | List of payment brands supported by merchant | | | X | |
| Security Code | 3 or 4 digit number associated with provided PAN | | | | X |
| Expiry Date | Expiration date for the associated PAN | | | | X |
| Final Amount | Total amount of the authorization request including merchandise, tax, and shipping | X | | | |
| PAN | Account number selected for payment. This may be the real account number or a psuedo number otherwise representing the real number to be used for payment | | | | X |
| Phone Number | Primary phone number for the cardholder | | | | X |
| Promotion Code and/or Loyalty Numbers | Special code used to identifiy qualifying transactions for specific offers or sales at the merchant | | | | X |
| Purchase Details | Detailed information of the items being purchased | | | X | |
| Shipping Info | Shipping address information | | | | X |
| Time Limits | Amount of time merchant will wait for a response in seconds | | | X | |
| Approve/Decline | Authorization response code | X | | | |
| Promotion Code Usage | Indicator as to whether or not promotion code or loyalty number was used for the specified transaction | X | | | |
| Transaction ID | Checkout platform generated unique id to identify related transactions | X | | | |

The extension fields define specific types of information included within the extensions of the authentication protocol. For example, the billing info field includes information relating to the billing address for the cardholder and is used in the PARes message. The brands supported field includes or is formatted to receive a list of payment brands (i.e., types of financial transaction cards) supported by the merchant and is used in the PAReq message. Although certain data fields are shown to be included within different extensions (e.g., the PAReq message extension includes the brands supported data field, the purchase details data field, and the time limits data field), it should be understood that included within the scope of this disclosure is that other data fields could be included with any of the extensions (VEReq, PAReq, and PARes) described herein or other data fields could be included with other extensions supported by the protocol. The data fields and the extensions described herein are for exemplary purposes and should not be considered limiting.

In the example embodiment, server system 112 may be associated with an interchange network, and may be referred to as an interchange computer system. Additionally, a check out platform may be associated with the interchange network. Server system 112 may be used for processing transaction data and for registering cardholders and/or merchants into a plurality of programs offered by the interchange network, including, but not limited to, an express check out program. In addition, at least one of client systems 114 may include a computer system associated with an issuer of a transaction 112, input terminal 115, the client systems 114, or any other similar computer device, programmed with computer-executable instructions to execute processes and techniques with a processor as described herein, constitutes exemplary means for utilizing extensions to an authentication protocol in performing a financial transaction for a user of a financial transaction card.

Figure 3:
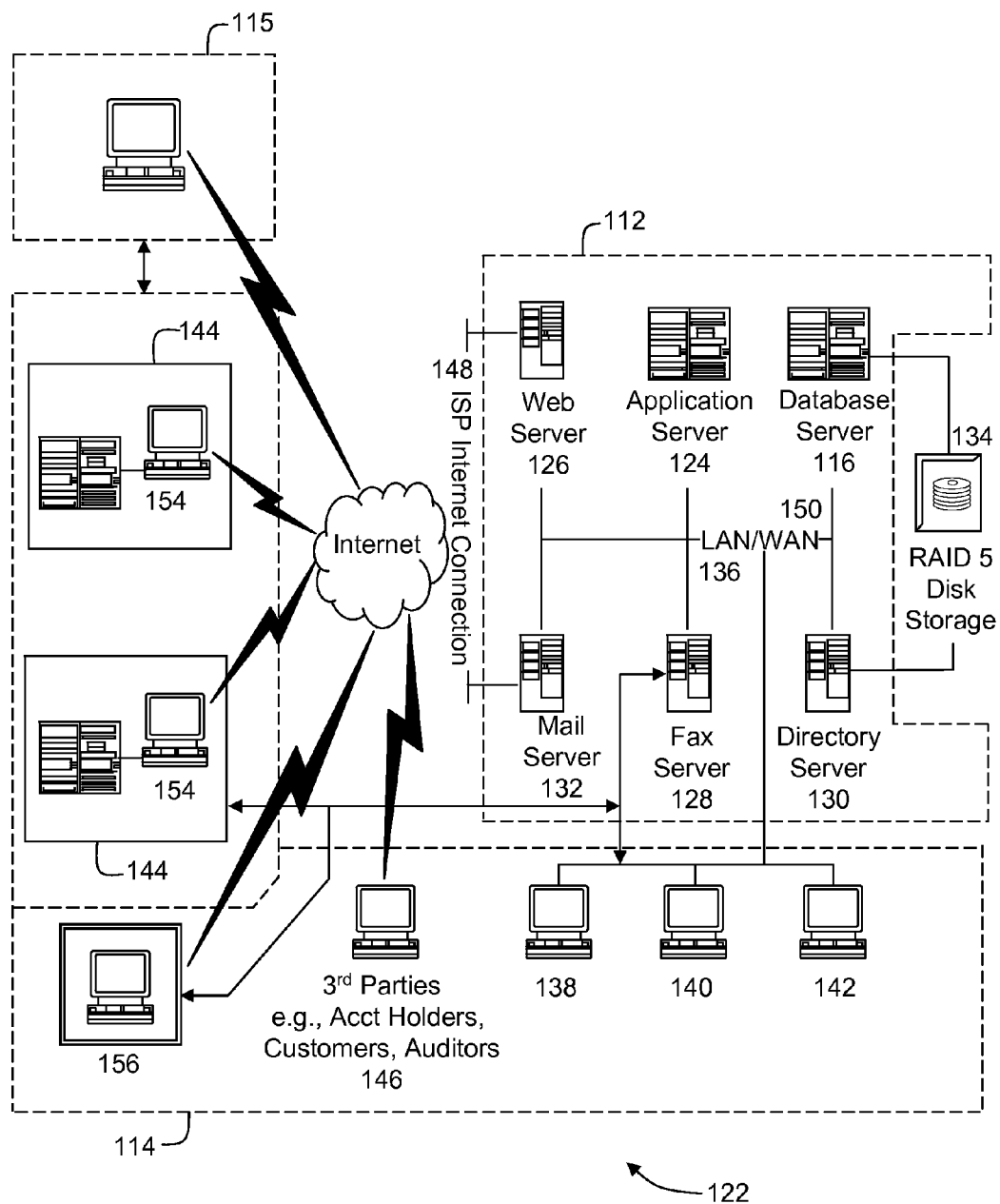
FIG. 3 is an expanded block diagram of the typical system shown in FIG. 2 in accordance with the present invention.

FIG. 3 is an expanded block diagram of an exemplary system 122 in accordance with one embodiment of the present invention. The components of system 122, which are identical to components of system 100 (shown in FIG. 2), are identified in FIG. 3 using the same reference numerals as used in FIG. 2. System 122 includes server system 112, client systems 114 and input terminals 115. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, etc., 146 using an ISP Internet connection 148. The communication in the exemplary embodiment is illustrated as being performed using the Internet, however, any other WAN type communication can be utilized in other embodiments, i.e., the systems and methods described herein are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 146 using a telephone link. Fax server 128 is configured to communicate with other workstations 138, 140, and 142 as well.

As used herein, the terms "software" and "firmware" are interchangeable, and include any computer program stored in memory for execution by personal computers, workstations, clients, and servers, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 4:
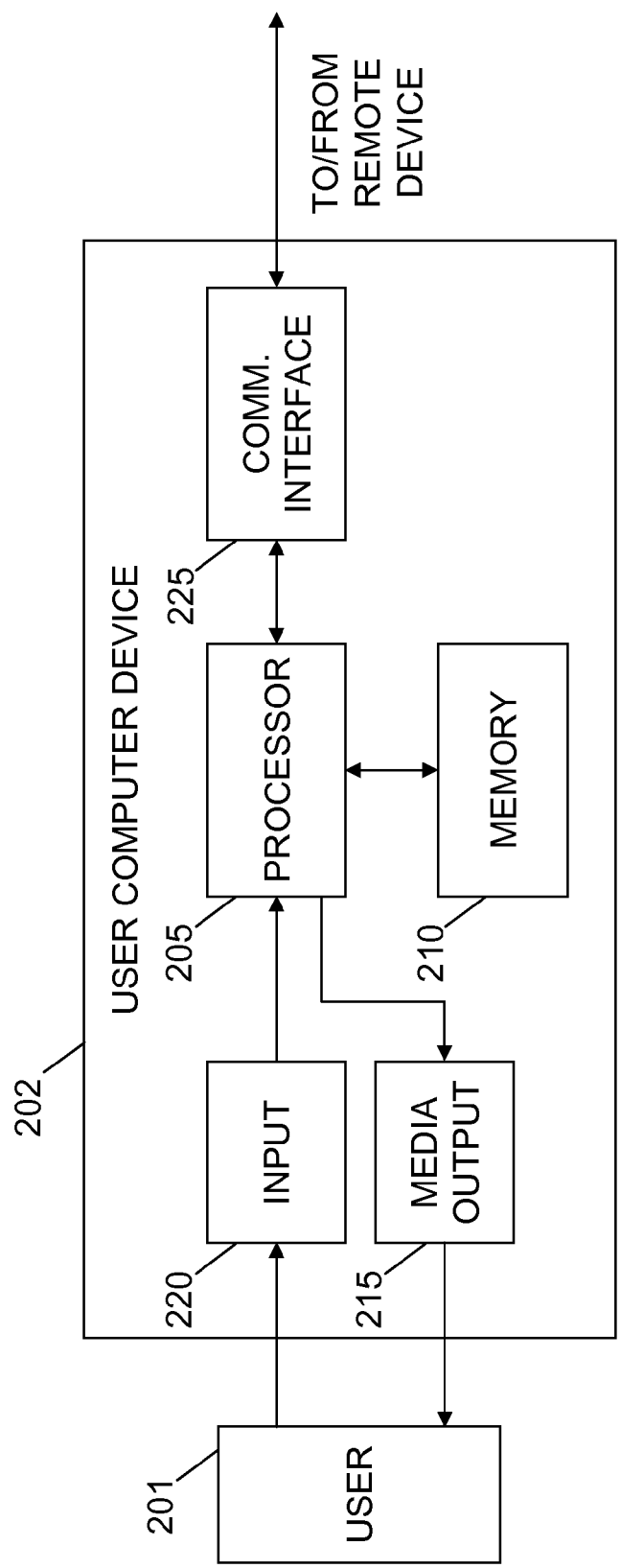
FIG. 4 illustrates an exemplary configuration of a client system shown in FIGS. 2 and 3.

FIG. 4 illustrates an exemplary configuration of a user computer device 202 operated by a user 201. User computer device 202 may include, but is not limited to, client systems 114, 138, 140, and 142, POS terminals 115, workstation 154, and manager workstation 156.

User computer device 202 includes a processor 205 for executing instructions. In some embodiments, executable instructions are stored in a memory area 210. Processor 205 may include one or more processing units (e.g., in a multi-core configuration). Memory area 210 is any device allowing information such as executable instructions and/or transaction data to be stored and retrieved. Memory area 210 may include one or more computer readable media.

User computer device 202 also includes at least one media output component 215 for presenting information to user 201. Media output component 215 is any component capable of conveying information to user 201. In some embodiments, media output component 215 includes an output adapter (not shown) such as a video adapter and/or an audio adapter. An output adapter is operatively coupled to processor 205 and operatively couplable to an output device such as a display device (e.g., a cathode ray tube (CRT), liquid crystal display (LCD), light emitting diode (LED) display, or "electronic ink" display) or an audio output device (e.g., a speaker or headphones). In some embodiments, media output component 215 is configured to present a graphical user interface (e.g., a web browser and/or a client application) to user 201. A graphical user interface may include, for example, an online store interface for viewing and/or purchasing items, and/or a wallet application for managing payment information.

In some embodiments, user computer device 202 includes an input device 220 for receiving input from user 201. User 201 may use input device 220 to select and/or enter, without limitation, one or more items to purchase, a purchase request, access credential information, and/or payment information. Input device 220 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 215 and input device 220.

User computer device 202 may also include a communication interface 225, which is communicatively couplable to a remote device such as server system 112. Communication interface 225 may include, for example, a wired or wireless network adapter and/or a wireless data transceiver for use with a mobile telecommunications network.

Stored in memory area 210 are, for example, computer readable instructions for providing a user interface to user 201 via media output component 215 and, optionally, receiving and processing input from input device 220. A user interface may include, among other possibilities, a web browser and/or a client application. Web browsers enable users, such as user 201, to display and interact with media and other information typically embedded on a web page or a website from server system 112. A client application allows user 201 to interact with a server application of a merchant computer system, POS terminals 115, and/or server system 112.

Figure 5:
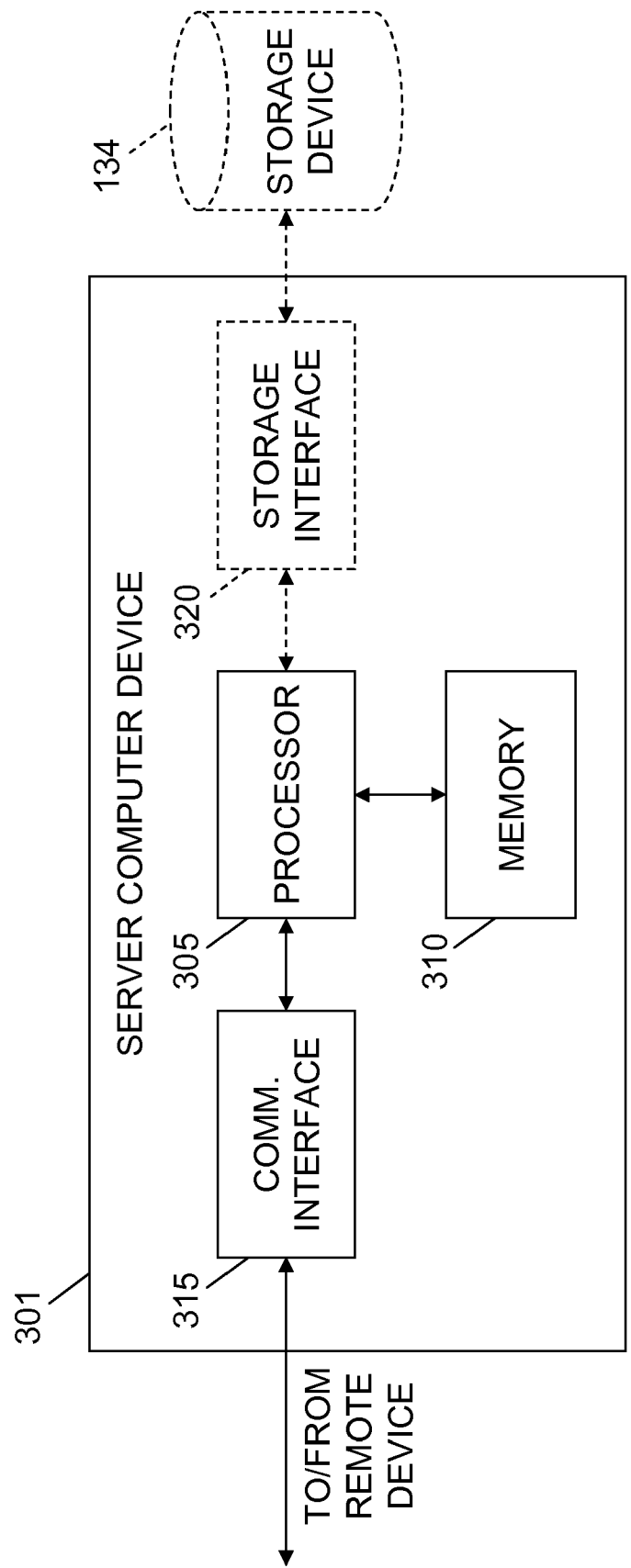
FIG. 5 illustrates an exemplary configuration of a server system shown in FIGS. 2 and 3.

FIG. 5 illustrates an exemplary configuration of a server computer device 301 such as server system 112 (shown in FIG. 2). Server computer device 301 may include, but is not limited to, a merchant computer system, POS terminals 115, database server 116, application server 124, web server 126, fax server 128, directory server 130, and/or mail server 132.

Server computer device 301 also includes a processor 305 for executing instructions. Instructions may be stored in a memory area 310, for example. Processor 305 may include one or more processing units (e.g., in a multi-core configuration).

Processor 305 is operatively coupled to a communication interface 315 such that server computer device 301 is capable of communicating with a remote device such as user computer device 202 or another server computer device 301. For example, communication interface 315 may receive requests from user computer device 114 via the Internet, as illustrated in FIG. 3.

Processor 305 may also be operatively coupled to a storage device 134. Storage device 134 is any computer-operated hardware suitable for storing and/or retrieving data, such as, but not limited to, data associated with database 120. In some embodiments, storage device 134 is integrated in server computer device 301. For example, server computer device 301 may include one or more hard disk drives as storage device 134. In other embodiments, storage device 134 is external to server computer device 301 and may be accessed by a plurality of server computer devices 301. For example, storage device 134 may include multiple storage units such as hard disks and/or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Figure 6:
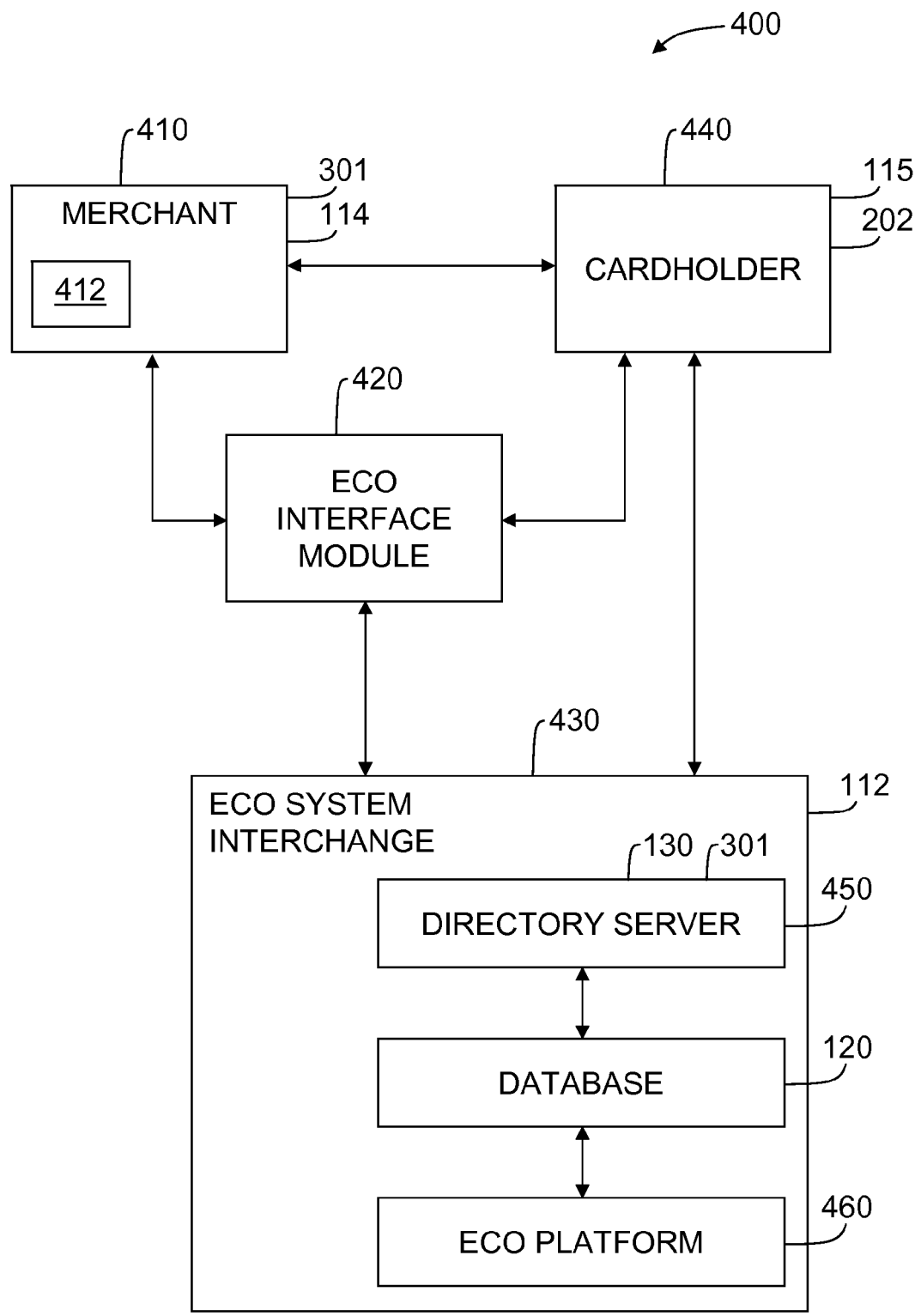
FIG. 6 is a block diagram of an exemplary system for communicating between various computer devices using a protocol with extensions in accordance with the present invention.

FIG. 6 is a block diagram of an exemplary system 400 for communicating between various computer devices using an enhanced protocol with extensions. In the exemplary embodiment, system 400 includes a merchant computer system 410, an express check out (ECO) interface module 420, an ECO system 430, and a cardholder workstation 440. ECO system 430 may include a directory server 450 and an ECO platform 460.

In an exemplary embodiment, merchant computer system 410 is a computer system similar to computer system 114 (shown in FIG. 3), and ECO system 430 is a computer system similar to server system 112 (shown in FIG. 3). In the exemplary embodiment, ECO system 430 is associated with interchange network 30 (shown in FIG. 1). Furthermore, in the exemplary embodiment, cardholder workstation 440 is an example of an input terminal, for example, one of input terminals 115 (shown in FIG. 3). More specifically, cardholder workstation 440 is a device that is able to connect to merchant computer system 410 via Internet connection 148 (shown in FIG. 3). For example, cardholder workstation 440 can be any device capable of accessing the Internet including, but not limited to, a desktop computer, a laptop computer, a personal digital assistant (PDA), a cellular phone, a smartphone, or other web-based connectable equipment. Merchant computer system 410 stores a merchant website. Merchant computer system 410 may be a computer system owned and operated by the merchant or may be a computer system owned and operated by a third party web host. A cardholder accesses the merchant website using cardholder workstation 440. The merchant website is a web interface (also referred to as a user interface) that facilitates purchasing of merchant goods and/or merchant services over the Internet or other network. As an option, the merchant website enables a cardholder to pay for the goods and/or services using a transaction card. In the exemplary embodiment, the merchant website also provides an express check out option 412 which enables a cardholder to perform a transaction using express check out functionality.

In the exemplary embodiment, ECO interface module 420 is a computer module that is communicatively coupled to merchant computer system 410, to ECO system 430, and to cardholder workstation 440. As used herein, a computer module may be a software platform or a hardware device or a combination of software and hardware. For example, ECO interface 420 may be a software platform stored on the memory of server system 112 (as shown in FIGS. 2 and 3). Alternatively, ECO interface module 420 may be software stored on a computer device positioned remotely from ECO system 430 or may be a hardware device that is separate and distinct from ECO system 430 (as shown in FIG. 6). ECO interface module 420 may also be included within ECO system 430. ECO interface 420 functions as an interface between merchant computer system 410 and ECO system 430. Merchant computer system 410 and/or ECO interface 420 may include, or be coupled to, databases with information stored therein that may be included in the extensions to the authentication protocol described above. Express check out option 412 may be provided to cardholder workstation 440 as an object presented to the cardholder. The express check out procedure is initiated upon its selection by the cardholder. The express check out procedure uses the information contained in the extensions to the authentication protocol in the execution of a financial transaction using the transaction card.

In the exemplary embodiment, ECO system 430 includes directory server 450 and ECO platform 460. ECO system 430 is associated with the interchange network and functions accordingly as described above. Directory server 450 operates in the same manner as the type used in known authentication protocol systems. ECO platform 460, while shown as being separate from directory server 450, may also reside on the same server(s) as directory server 450.

In the exemplary embodiment, ECO platform 460 is coupled to a database such as database 120 which contains information that is formatted for inclusion in extensions to the authentication protocol. As described above, the information is related to the merchant, the transaction card, and/or the cardholder. For example, the information can include a merchant identifier, a transaction card account number, access credentials, an expiration date, a CVC2 code, billing addresses, and/or shipping addresses. The access credentials are associated with a cardholder and/or a cardholder account. The cardholder and/or cardholder account may be tied to a plurality of transaction cards. In addition, for each transaction card that has information stored in the database, one or more billing and/or shipping addresses may also be stored. Accordingly, different transaction cards may be associated with a single cardholder and may each have different billing and/or shipping addresses. ECO system 430 may transmit and receive information (i.e., extensions to the protocol) from both ECO interface 420 and cardholder workstation 440.

Although described herein as including one merchant computer system 410, system 400 may include a plurality of merchant computer systems associated with multiple merchants. More specifically, ECO interface 420 may be in communication with multiple merchants and facilitate communication between multiple merchants and ECO system 430.

Figure 7:
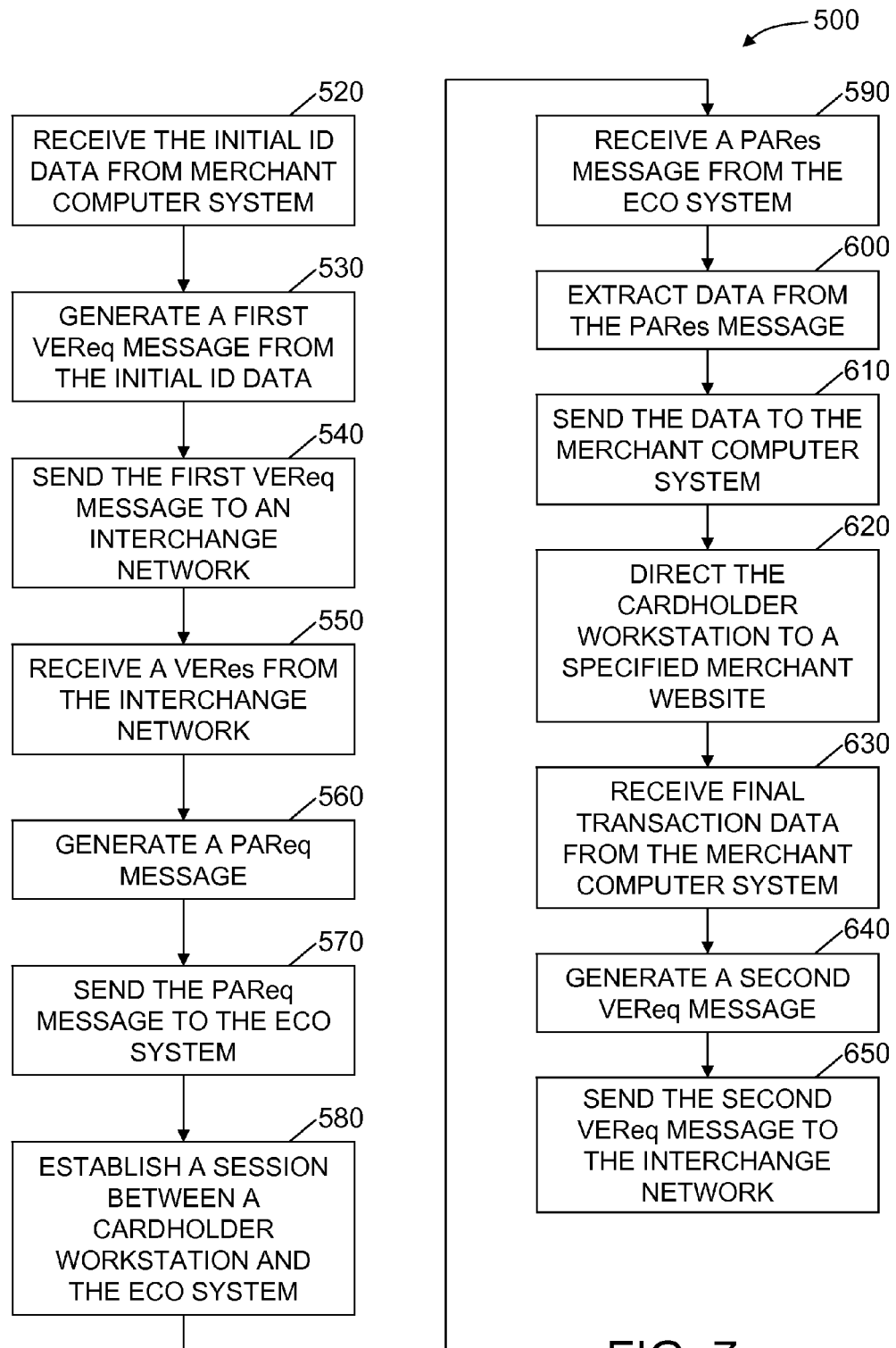
FIG. 7 is a flowchart illustrating an exemplary method for using a protocol with extensions to communicate information between computer devices when performing a financial transaction in accordance with the present invention.

FIG. 7 is a flowchart 500 illustrating an exemplary method for using an enhanced protocol (i.e., a protocol with data field extensions) to communicate information between computer devices when performing a financial transaction. In the exemplary embodiment, flowchart 500 illustrates an exemplary method that can be implemented by system 100 (shown in FIG. 2). The method described in flowchart 500 relates to the receiving and transmitting of messages and information between, for example, merchant computer system 410 (shown in FIG. 4), ECO interface 420 (shown in FIG. 4), ECO system 430 (shown in FIG. 4), and cardholder workstation 440 (shown in FIG. 4).

Typically, a cardholder accesses a merchant website via a computer device, for example, cardholder workstation 440. The merchant website displays products and/or services that may be purchased by the cardholder. The cardholder is able to select one or more products and/or services to be purchased via the merchant website. The exemplary method begins when the cardholder initiates a program offered by the merchant and/or the interchange network, for example, the express check out program described above, by selecting express check out option 412, which is displayed and provided to the cardholder via the merchant website. For example, a cardholder interacting with a merchant website via cardholder workstation 440 may select express check out option 412, which may be a button displayed on the merchant website for selection by the cardholder. Alternatively, the cardholder may select express check out option 412 before selecting products and/or services to be purchased.

In the exemplary embodiment, upon selection of express check out option 412, merchant computer system 410 sends initial identification (ID) data to ECO interface 420. For example, the initial ID data may include, without limitation, merchant information (e.g., a merchant identifier, brands supported by the merchant, and time limits), transaction information (e.g., a cost of the goods/services selected and purchase details), information identifying the location of cardholder workstation 440 (e.g., a uniform resource locator), and/or an account number. In some embodiments, the initial ID data is sent to ECO interface 420 in a format specified by ECO interface 420.

In the exemplary embodiment, after receiving 520 the initial ID data from merchant computer system 410, ECO interface 420 generates 530 a first verification enrollment request (VEReq) message from the initial ID data. ECO interface 420 then sends 540 the first VEReq message to an interchange network, for example, ECO system 430. In some embodiments, ECO system 430 accesses data stored in directory server 450 of ECO system 430 to generate a verification enrollment response (VERes) message indicating whether the merchant and/or the cardholder is enrolled in the express check out program. More specifically, ECO system 430 may compare the received merchant identifier to merchant identifiers stored in a database, for example database 120 (shown in FIG. 2), to determine if the merchant is enrolled in the express check out program; and/or ECO system 430 may compare the received account number to account numbers stored in the database, for example database 120, to determine if the cardholder is enrolled in the express check out program. ECO system 430 sends the VERes message to ECO interface 420. If the merchant/cardholder is not enrolled in the express check out program, ECO system 430 sends a negative VERes response. If the merchant/cardholder is enrolled in the express check out program, ECO system 430 sends a positive VERes response. Upon receiving 550 the positive VERes response, ECO interface 420 generates 560 a payer authorization request (PAReq) message that includes enhanced protocol extensions and sends 570 the PAReq message to ECO system 430. ECO interface 420 also establishes 580 a session between cardholder workstation 440 and ECO system 430. Accordingly, ECO interface 420 enables merchants to utilize the express check out function offered by ECO system 430 without having to store or install the functionality of ECO interface 420 on the merchant computer systems.

According to another embodiment, ECO system 430 uses the account number to determine whether the merchant is enrolled in the express check out program. The account number is specific to (e.g., assigned to) the cardholder/user, while in other embodiments, the account number is a predefined or static number provided by the merchant to the directory server. In either embodiment, the directory server checks the enrollment status of the account number against a list of enrolled account numbers (e.g., to determine whether the account number is enrolled in a secure transaction processing program and/or a cardholder authentication program), and returns a verify enrollment response (VERes) message to the ECO interface indicating the status of the enrollment of the account number. For example, if the account number is included in the list of enrolled account numbers, the directory server transmits a VERes message with a positive (e.g., true or "yes") response verifying the enrollment of the cardholder. If the account number is not included in the list of enrolled account numbers, the directory server transmits a VERes message with a negative (e.g., false or "no") response. The cardholder proceeds to select, using the input device, the items (e.g., products and/or services) which the cardholder desires to purchase from the merchant. Alternatively, the cardholder may select such items prior to indicating an intention to use the express check out feature. After the user has selected items to purchase and the ECO interface has received a VERes message with a positive response, the ECO interface generates a payer authentication request (PAReq) message with one or more predefined extensions and transmits the PAReq message to the ECO system. For example, the ECO interface may transmit the PAReq message to a check out platform of the ECO system, which is also known as the interchange computer system. The ECO interface also establishes a session between the cardholder workstation and the ECO system. The PAReq message includes the enhanced protocol extensions for communicating additional information between the ECO interface and the ECO system.

In the example embodiment, ECO system 430, which is associated with the interchange network, receives information from the cardholder via cardholder workstation 440 (e.g., access credentials, transaction card selection, and shipping information). For example, during the session initiated by ECO interface 420, ECO system 430 may send a first information request to cardholder workstation 440 requesting access credentials. ECO system 430 may then receive access credentials from cardholder workstation 440. Using the access credentials from the cardholder, ECO system 430 verifies enrollment of the cardholder in the express check out program. In some embodiments, if cardholder enrollment is verified, ECO system 430 may send a second information request to cardholder workstation 440 requesting that the cardholder select from multiple transaction cards associated with the access credentials. ECO system 430 may then receive the transaction card selection. Accordingly, the cardholder need only remember their access credentials to utilize any one of a plurality of transaction cards to complete a transaction with the merchant. Furthermore, in some embodiments, ECO system 430 may send a third information request to cardholder workstation 440 requesting that the cardholder select from multiple addresses associated with the selected transaction card. For example, multiple shipping addresses may be stored in, for example, directory server 450 (e.g., a cardholder home address and a cardholder work address) and associated with the selected transaction card. By establishing the session between cardholder workstation 440 and ECO system 430, ECO interface 420 facilitates verifying the cardholder access credentials without the merchant's participation. Excluding the merchant from the verification of the cardholder's access credentials keeps knowledge of the access credentials with only ECO system 430 and the cardholder.

In the exemplary embodiment, ECO system 430 generates a payer authorization response (PARes) message based on the data received from the cardholder. The PARes message contains information formatted in certain pre-defined extensions (i.e., enhanced protocol extensions) that are defined in Table 1. For example, the PARes message may include, for example, billing information (e.g., billing address of the cardholder), a transaction card security code, a transaction card expiry date, a cardholder phone number, and a shipping address. To generate the PARes message, ECO system 430 formats the data received from the cardholder into certain predefined extension fields (i.e., enhanced protocol extensions) that are included within the PARes message. For example, the enhanced protocol extensions associated with the PARes message may include at least a billing information extension, a security code (e.g., CVC2) extension, an expiry date extension, a PAN extension, a phone number extension, a promotion code extension, and a shipping information extension.

In the exemplary embodiment, ECO system 430 sends the PARes message to ECO interface 420. Upon receiving 590 the PARes message, ECO interface 420 extracts 600 data from the PARes message into a specified message format and sends 610 the data to merchant computer system 410. Merchant computer system 410 is able to use the data to automatically populate order forms, thus relieving the cardholder of the need to provide the information manually. For example, the data received can include the cardholder's full name and shipping address which is then automatically populated in an order form. Eliminating the cardholder from the data entry process facilitates increasing the accuracy of the information received by the merchant and facilitates reducing the time required to complete the transaction.

In the exemplary embodiment, ECO interface 420 also directs 620 cardholder workstation 440 to a specified merchant website. For example, after ECO interface 420 sends 610 the extracted data to merchant computer system 410, the session between ECO system 430 and cardholder workstation 440 is complete and ECO interface 420 directs 620 cardholder workstation 440 to a confirmation page provided by merchant computer system 410. In another example, ECO interface 420 directs 620 cardholder workstation 440 to a root merchant web address in order to facilitate cardholder browsing of products or services for sale.

After the PARes message is received by merchant computer system 410, and the cardholder selects a final submit option, the total cost of the transaction may then be calculated by merchant computer system 410 based at least in part on the received information (i.e., the shipping costs are calculated based on the shipping address). Merchant computer system 410 sends final transaction data to ECO interface 420. The final transaction data may include the total cost of the transaction, which is based at least in part on the received information (e.g., the items selected for purchase and the shipping costs calculated based on the shipping address). After receiving 630 the final transaction data, ECO interface 420 generates 640 a second VEReq message based on the final transaction data. The second VEReq message includes certain predefined extensions (i.e., enhanced protocol extensions) having information formatted within these extensions that include final amount data, approve/decline data, promotion code data, and transaction ID data (as shown in Table 1). In other words, the enhanced protocol extensions of the second VEReq message may include certain predefined extensions including a final amount extension, an approve/decline extension, a promotion code usage extension, and a transaction ID extension. ECO interface 420 sends 650 the second VEReq message to directory server 450 of ECO system 430. Directory server 450 in turn stores the information in a database for later use. In addition, directory server 450 may authorize the transaction, or other mechanisms may be used to authorize the transaction.

The messages sent between the different computing devices (i.e., the VEReq, VERes, PAReq, and PARes messages) may be encrypted by the sending device and decrypted by the receiving device. For example, the PARes message may be encrypted by the ECO platform and decrypted by the ECO interface.

Although described herein as communicating with one merchant computer system, ECO interface 420 may be configured to perform the functions described herein on behalf of multiple merchants. Furthermore, ECO interface 420 may perform the functions described herein in real-time or in batch.

While the methods and systems have been described herein in terms of various specific embodiments, those skilled in the art recognizes that the described methods and systems can be practiced with modification within the spirit and scope of the claims.

This written description uses examples to disclose the invention, including the best mode, and also to enable any person skilled in the art to practice the invention, including making and using any devices or systems and performing any incorporated processes. The patentable scope of the invention is defined by the claims, and may include other examples that occur to those skilled in the art. These other examples are intended to be within the scope of the claims if they have structural elements that do not differ from the literal language of the claims, or if they include equivalent structural elements with insubstantial differences from the literal language of the claims.

What is claimed is:

1. A method for communicating financial transaction data between a plurality of computer devices using an interface module and an enhanced protocol, the financial transaction initiated by a cardholder at an input terminal using a transaction card for completing a purchase from a merchant, said method comprising:
   receiving, at the interface module, initial identification (ID) data directly from a computer associated with the merchant, the interface module being a computer module separate from the merchant computer, the interface module being further configured for direct communication with the merchant computer and the cardholder input terminal;
   generating a first verification enrollment request (VEReq) message at the interface module based on the initial ID data, the first VEReq message including at least one of a merchant identifier and an account number;
   transmitting the first VEReq message to an interchange network computer system;
   receiving a verification enrollment response (VERes) message from the interchange network computer system, the VERes message affirmatively verifying enrollment of the merchant in an express check out program; and
   generating, at the interface module, a payer authentication request (PAReq) message using the enhanced protocol, the enhanced protocol defining a first set of data field extensions associated with the PAReq message.

2. A method in accordance with claim 1, further comprising:
   sending the PAReq message to the interchange network computer system; and
   opening a session between the cardholder input terminal and the interchange network computer system, the session is opened via the interface module, the cardholder is prompted to input access credentials during the session.

3. A method in accordance with claim 1, wherein generating a PAReq message further comprises:
   generating, at the interface module, the PAReq message using the enhanced protocol, the enhanced protocol defining the first set of data field extensions associated with the PAReq message, the first set of data field extensions including data representing transaction card brands supported for payment by the merchant, a response time limit, and item purchase information.

4. A method in accordance with claim 1, further comprising:
   receiving a payer authentication response (PARes) message using the enhanced protocol, the enhanced protocol defining a second set of data field extensions associated with the PARes message; and extracting data from the PARes message and the second set of data field extensions.

5. A method in accordance with claim 4, wherein extracting data further comprises:
  formatting the extracted data into a predefined format; and
  transmitting the formatted data from the interface module to the merchant computer system.

6. A method in accordance with claim 5, further comprising:
  automatically directing the input terminal to a specified merchant website such that the cardholder is able to complete the financial transaction using the specified merchant website.

7. A method in accordance with claim 4, wherein receiving a PARes message further comprises:
  receiving the PARes message using the enhanced protocol, the enhanced protocol defining the second set of data field extensions associated with the PARes message, the second set of data field extensions including data representing at least one of billing information, a security code, an expiry date, a primary account number, a phone number of the cardholder, a promotion code, loyalty numbers, and shipping information.

8. A method in accordance with claim 1, further comprising:
  generating, at the interface module, a second VEReq message using the enhanced protocol upon the cardholder completing the financial transaction, the enhanced protocol defining a third set of data field extensions associated with the second VEReq message, the third set of data field extensions including data representing at least one of a final transaction amount, an authorization response code, and a promotion code associated with the financial transaction; and
  transmitting the second VEReq message to the interchange computer.

9. A method in accordance with claim 1, wherein generating a first verification enrollment request (VEReq) message further comprises:
  generating the first VEReq message at the interface module based on the initial ID data, the first VEReq message including a first data field populated by the interface module with the merchant identifier and a second data field populated by the interface module with the account number, the merchant identifier used by the interchange network computer system to verify the enrollment of the merchant in the express check out program, the account number used by the interchange network computer system to verify the enrollment of the cardholder in the express check out program.

10. A system for processing a financial transaction using an enhanced protocol, said system comprising:
  an interchange network computer system; and
  an interface module in communication with a merchant computer system, a cardholder input terminal, and the interchange network computer system, the interface module being further configured for direct communication with the merchant computer system and the cardholder input terminal,
  wherein the cardholder input terminal is configured to access a merchant website by communicating with the merchant computer system to enable a cardholder to initiate the financial transaction using a transaction card, and
  wherein the interface module is a computer module separate from the merchant computer, and wherein the interface module is configured to process the financial transaction by communicating with the interchange network computer system using an enhanced protocol.

11. A system in accordance with claim 10, wherein the interface module is further configured to:
  receive initial identification (ID) data from the merchant computer system;
  generate a first verification enrollment request (VEReq) message based on the initial ID data, the first VEReq message including at least one of a merchant identifier and an account number used to verify the enrollment of the merchant in an express check out program;
  transmit the first VEReq message to the interchange network computer system;
  receive a verification enrollment response (VERes) message, the VERes message affirmatively verifies enrollment of the merchant in the express check out program; and
  generate a payer authentication request (PAReq) message using the enhanced protocol, the enhanced protocol defining a first set of data field extensions associated with the PAReq message.

12. A system in accordance with claim 11, wherein the interface module is further configured to:
  send the PAReq message to the interchange network computer system; and
  open a session between the cardholder input terminal and the interchange network computer system, the cardholder is prompted to input access credentials during the session.

13. A system in accordance with claim 10, wherein the interface module is further configured to:
  generate a payer authentication request (PAReq) message using the enhanced protocol, the enhanced protocol defining the first set of data field extensions associated with the PAReq message, the first set of data field extensions including data representing at least one of a transaction card brands supported for payment, a response time limit, and item purchase information.

14. A system in accordance with claim 10, wherein the interface module is further configured to:
  receive a payer authentication response (PARes) message using the enhanced protocol, the enhanced protocol defining a second set of data field extensions associated with the PARes message; and
  extract data from the PARes message and the second set of data field extensions.

15. A system in accordance with claim 14, wherein the interface module is further configured to:
  format the extracted data into a predefined format;
  transmit the formatted data to the merchant computer system; and
  automatically direct the input terminal to a specified merchant website such that the cardholder is able to complete the financial transaction using the specified merchant website.

16. A system in accordance with claim 14, wherein the interface module is further configured to:
  receive the PARes message using the enhanced protocol, the enhanced protocol defining the second set of data field extensions associated with the PARes message, the second set of data field extensions including data representing at least one of billing information, a security code, an expiry date, a primary account number, a phone number of the cardholder, a promotion code, loyalty numbers, and shipping information.

17. A system in accordance with claim 10, wherein the interface module is further configured to:
  generate a second VEReq message using the enhanced protocol upon the cardholder completing the financial transaction, the enhanced protocol defining a third set of data field extensions associated with the second VEReq message, the third set of data field extensions including data representing at least one of a final transaction amount, an authorization response code, and a promotion code associated with the financial transaction; and
  transmit the second VEReq message to the interchange network computer system.

18. A system in accordance with claim 10, wherein the interface module is further configured to:
  generate the first VEReq message based on the initial ID data by populating a first data field with the merchant identifier and a second data field with the account number, the merchant identifier used by the interchange network computer system to verify the enrollment of the merchant in the express check out program, the account number used by the interchange network computer system to verify the enrollment of the cardholder in the express check out program.

19. An interchange network computer for processing a financial transaction using an enhanced protocol, the financial transaction initiated by a cardholder with a merchant using a transaction card, said interchange network computer comprising:
  an interchange processor; and
  an interface module in communication with a merchant computer system, a cardholder input terminal, and the interchange processor, the interface module being further configured for direct communication with the merchant computer system and the cardholder input terminal, the interface module programmed to:
    receive initial identification (ID) data directly from the merchant computer system in response to the initiated financial transaction;
    generate a first verification enrollment request (VEReq) message based on the initial ID data, the first VEReq message including at least one of a merchant identifier and an account number used to verify the enrollment of the merchant in an express check out program;
    transmit the first VEReq message to the interchange processor;
    receive a verification enrollment response (VERes) message from the interchange processor, the VERes message affirmatively verifies enrollment of the merchant in the express check out program; and
    generate a payer authentication request (PAReq) message using the enhanced protocol, the enhanced protocol defining a first set of data field extensions associated with the PAReq message.

20. An interchange network computer in accordance with claim 19, wherein the interface module is further programmed to:
  send the PAReq message to the interchange processor; and
    open a session between the cardholder input terminal and the interchange processor, the cardholder is prompted to input access credentials during the session.

21. An interchange network computer in accordance with claim 19, wherein the first set of data field extensions include data representing at least one of a transaction card brands supported for payment, a response time limit, and item purchase information.

22. An interchange network computer in accordance with claim 19, wherein the interface module is further programmed to:
  receive a payer authentication response (PARes) message using the enhanced protocol, the enhanced protocol defining a second set of data field extensions associated with the PARes message; and
  extract data from the PARes message and the second set of data field extensions.

23. An interchange network computer in accordance with claim 22, wherein the interface module is further programmed to:
  format the extracted data into a predefined format;
  transmit the formatted data to the merchant computer system; and
  automatically direct the input terminal to a specified merchant website such that the cardholder is able to complete the financial transaction using the specified merchant website.

24. An interchange network computer in accordance with claim 22, wherein the second set of data field extensions include data representing at least one of billing information, a security code, an expiry date, a primary account number, a phone number of the cardholder, a promotion code, loyalty numbers, and shipping information.

25. An interchange network computer in accordance with claim 19, wherein the interface module is further programmed to:
  generate a second VEReq message using the enhanced protocol upon the cardholder completing the financial transaction, the enhanced protocol defining a third set of data field extensions associated with the second VEReq message, the third set of data field extensions including data representing at least one of a final transaction amount, an authorization response code, and a promotion code associated with the financial transaction; and
  transmit the second VEReq message to the interchange processor.

26. An interchange network computer in accordance with claim 19, wherein the interface module is further programmed to:
  generate the first VEReq message based on the initial ID data by populating a first data field with the merchant identifier and a second data field with the account number, the merchant identifier used by the interchange processor to verify the enrollment of the merchant in the express check out program, the account number used by the interchange processor to verify the enrollment of the cardholder in the express check out program.

27. A computer program embodied on a computer readable medium for communicating financial transaction data between a plurality of computer devices using an interface module and an enhanced protocol, the financial transaction initiated by a cardholder at an input terminal using a transaction card for completing a purchase from a merchant, said program comprises at least one code segment executable by the interface module to instruct the interface module to:
  receive initial identification (ID) data from a computer associated with the merchant, the interface module being a computer module separate from the merchant computer, the interface module being further configured for direct communication with the merchant computer and the cardholder input terminal;
  generate a first verification enrollment request (VEReq) message based on the initial ID data, the first VEReq message including at least one of a merchant identifier and an account number; transmit the first VEReq message to an interchange network computer system;

receive a verification enrollment response (VERes) message from the interchange network computer system, the VERes message affirmatively verifying enrollment of the merchant in an express check out program; and generate a payer authentication request (PAReq) message using the enhanced protocol, the enhanced protocol defining a first set of data field extensions associated with the PAReq message.

* * * * *